United States Patent
Day et al.

(10) Patent No.: US 7,114,042 B2
(45) Date of Patent: Sep. 26, 2006

(54) METHOD TO PROVIDE ATOMIC UPDATE PRIMITIVES IN AN ASYMMETRIC HETEROGENEOUS MULTIPROCESSOR ENVIRONMENT

(75) Inventors: Michael Norman Day, Round Rock, TX (US); Charles Ray Johns, Austin, TX (US); James Allan Kahle, Austin, TX (US); Peichum Peter Liu, Austin, TX (US); Thuong Quang Truong, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 477 days.

(21) Appl. No.: 10/443,727

(22) Filed: May 22, 2003

(65) Prior Publication Data

US 2004/0236914 A1 Nov. 25, 2004

(51) Int. Cl.
*G06F 13/00* (2006.01)
(52) U.S. Cl. .................... 711/152; 711/711; 711/163
(58) Field of Classification Search ............... 711/152, 711/154, 163, 170
See application file for complete search history.

(56) References Cited

U.S. PATENT DOCUMENTS

| 5,727,172 | A | * | 3/1998 | Eifert et al. ............... 710/110 |
| 5,822,588 | A | * | 10/1998 | Sterling et al. ............. 717/131 |
| 6,493,741 | B1 | * | 12/2002 | Emer et al. ................. 718/107 |
| 6,578,033 | B1 | | 6/2003 | Singhal et al. |

FOREIGN PATENT DOCUMENTS

| KR | 0135927 | 1/1998 |
| KR | PUPA 2000-0006264 | 1/2000 |
| KR | PUPA 2001-0031689 | 4/2001 |
| WO | WO 99/23559 | 5/1999 |

\* cited by examiner

*Primary Examiner*—Reba I. Elmore
(74) *Attorney, Agent, or Firm*—Stephen R. Tkacs; Diana R. Gerhardt; Robert M. Carwell

(57) ABSTRACT

The present invention provides for atomic update primitives in an asymmetric single-chip heterogeneous multiprocessor computer system having a shared memory with DMA transfers. At least one lock line command is generated from a set comprising a get lock line command with reservation, a put lock line conditional command, and a put lock line unconditional command.

14 Claims, 3 Drawing Sheets

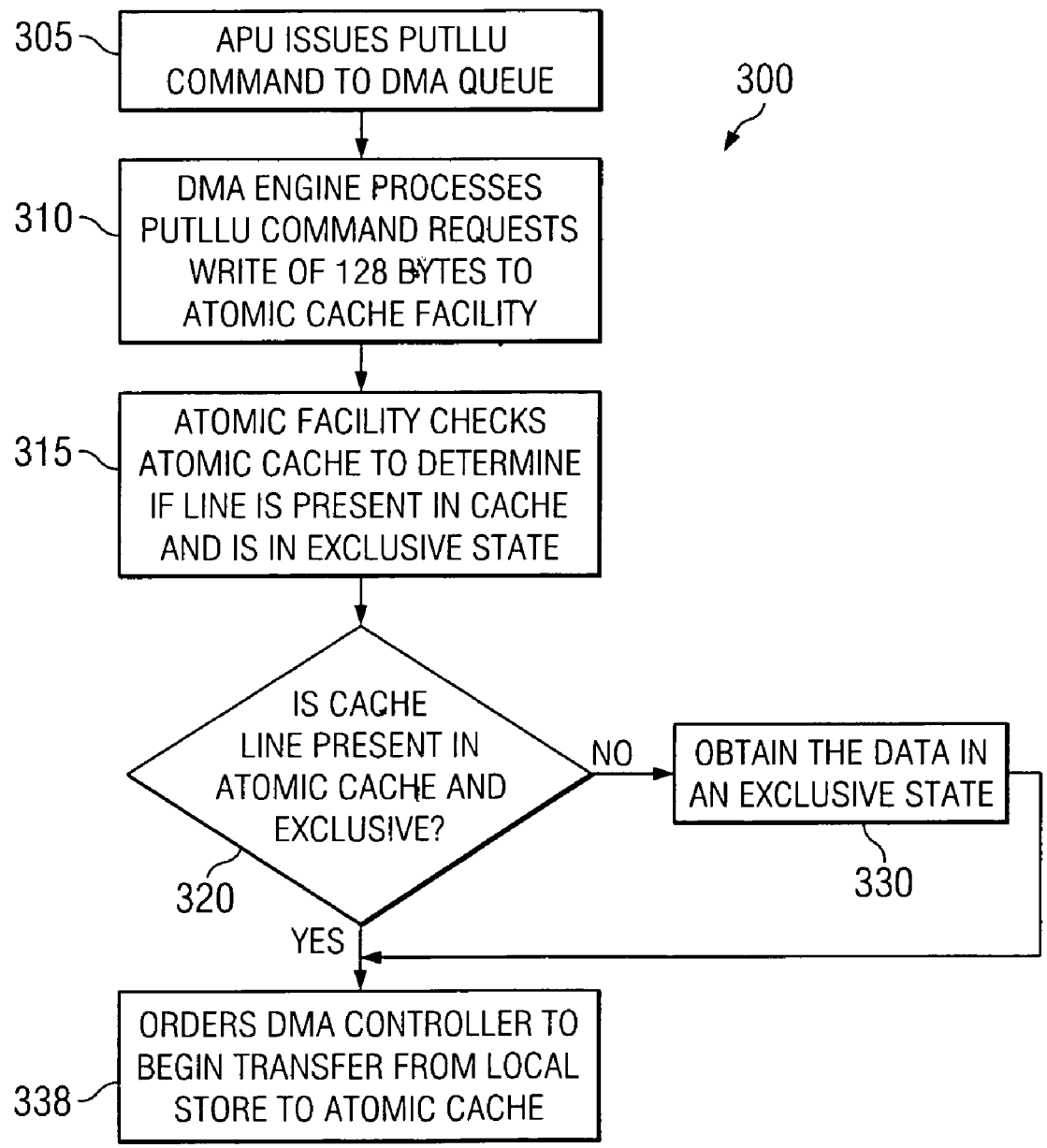

METHOD TO PROVIDE ATOMIC UPDATE PRIMITIVES IN AN ASYMMETRIC HETEROGENEOUS MULTIPROCESSOR ENVIRONMENT

TECHNICAL FIELD

The invention relates generally to atomic update of memory and, more particularly, to employment of atomic updates using direct memory access commands with attached processor units.

BACKGROUND

In conventional symmetric multiprocessor systems, that is, multiprocessors comprising a plurality of main processor units (MPUS), the MPUs have direct access to common shared memory through the employment of load/store instructions. In addition to these load/store instructions, "atomic" read/modify/write capabilities are frequently provided in order to control the synchronization and access to memory shared by programs executing on multiple MPUs. "Atomic" commands can generally be defined as commands which allow data in memory to be read, modified and written as if the sequence were a single operation with respect to other units potentially accessing that data area. This is traditionally done by a hardware sequence that either locks out other unit access to the memory area, until the entire sequence is done, or uses a more primitive load with reservation and conditional store technique. Generally, this is done to ensure that an area of memory is completely updated and consistent before being read or written to by another MPU or I/O unit with access to the memory—that is, the atomic command or update sequence is "finished" with that memory area.

Atomic commands frequently take the form of special instructions, such as "compare and swap," "test and set," "fetch and no-op," "fetch and store," and so on. An alternative technique is to provide a more fundamental "load and reserve" and "store conditional" instruction pair in an MPU which provides the capability to implement the atomic operation sequences in software. These techniques can work well in a symmetric multiprocessor system consisting of homogeneous MPUs.

In an asymmetric heterogeneous multiprocessor system, the MPUs are arranged in a conventional shared memory style. Specialized processors, attached processor units (APUs), have their own private instruction and data memory which have indirect access to the shared memory through a block move ordered by a direct memory access (DMA) engine. With a plurality of MPUs and APUs employing DMA engines accessing shared memory, as peers, there exists a need to extend an atomic update mechanism to the DMA engines. This is generally done in order to provide a facility to coordinate access to data in the shared memory. In an environment where multiple APUs exist without such a mechanism, using a master/slave approach of the MPUs parceling out work to each APU one at a time, through commands to the DMA engine, results in poor system utilization and efficiency due to idle time in the APUs and the MPU time that is used to assign work to individual APUs.

Therefore, what is needed is a DMA engine that can be employed by APUs to copy data between APU local storage and shared system memory while participating as a peer with other MPUs and APU/DMA engines in atomic updates of shared memory.

SUMMARY OF THE INVENTION

The present invention provides atomic update primitives for an asymmetric single-chip heterogeneous multiprocessor computer system having a shared memory with DMA. At least one lock line command is generated from a set comprising a get lock line command with reservation, a put lock line conditional command, and a put lock line unconditional command.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 3 illustrates a method of employing DMA lockline put unconditional.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
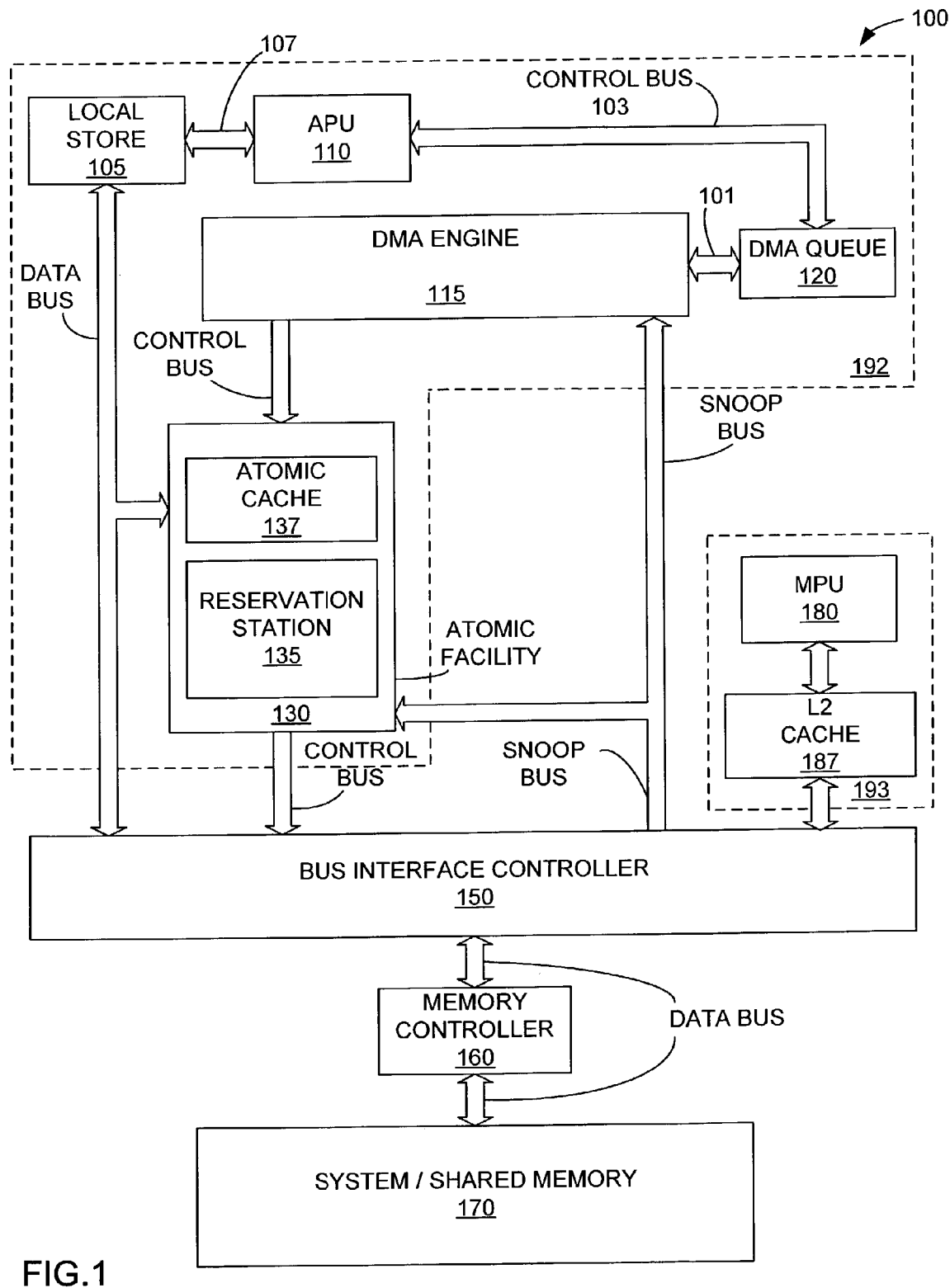
FIG. 1 schematically depicts a system map of multiple busses coupled to a system memory, a DMA engine, an atomic facility and a local store.

Turning to FIG. 1, disclosed is a system 100 that allows for an APU 110 to participate more autonomously as a peer in a multiprocessor environment. This is performed through the employment of the APU 110 having indirect access to a system memory 170 through block mode employment of a DMA engine 115. Generally, in the system 100, the APU 110 employs atomic read/modify/write sequences by gaining access and locking reservation granules of the shared memory 170 using a "load and reserve" (getllar) lock line command and the "conditional store" (putllc) or "unconditional store" (putllu) lock line commands.

The system 100 comprises one or more MPU complexes 193 coupled to the bus interface controller (BIC) 150, as well as one or more APU complexes 192 coupled to the BIC 150. The BIC 150 is coupled to a memory controller 160, which is in turn coupled to the system/shared memory 170. At least one APU/DMA complex 192 and at least one MPU unit complexes 193, having one or more MPUs 180, comprise the computational capability of the system.

The APU complex 192 comprises the APU 110 coupled to a local store 105. The APU 110 is coupled to a DMA queue 120 through a control bus. The DMA queue 120 is coupled to a DMA engine. The DMA engine 115 is coupled to an atomic facility 130.

The atomic facility 130 comprises a reservation station (RS) 135 and an atomic cache 137. The atomic cache 137 can be a level two (L2) cache. The atomic facility 130 is coupled to a BIC 150 through a control bus and a snoop bus.

The MPU complex 193 comprises one or more MPUs 180 coupled to an L2 cache 187 which is coupled to the BIC 150. The BIC 150 is coupled to a memory controller 160, which is in turn coupled to the system/shared memory 170. In a further embodiment, a plurality of APU complexes 192 are employed in the system 100, but without the employment of MPU complexes 193, to support atomic update sequences between the APUs 110 via DMA commands. Alternatively, other units that support atomic update sequences via DMA commands are within the scope of the present invention.

Generally, the APU 110, for such reasons as synchronization, employs atomic operations through the use of getllar, putllc, and putllu lock line DMA commands. The DMA commands are issued by the DMA engine 115 at the bequest of the APU 110, after being appropriately sorted by the DMA queue 120. Typically, the lockline DMA commands are forwarded to the front of the DMA queue 120 for immediate execution since acquiring locks and releasing locks are typically synchronous with respect to the program executing in the APU 110.

Typically, the RS 135 is set by the issuance of the DMA command getllar. The data of a selected memory address in the system memory 170, at the command of the DMA engine 115, is conveyed to the local store 105 for processing. Typically, this data transfer can be a cache line, 128 bytes. This data can sometimes be found in the atomic cache 137 (if a previously issued getllar was used to access this data). However, if not found in the atomic cache 137, a request is made to the BIC 150 for the data, and the data retrieved from the system memory 170 or a cache associated with another attached unit (MPU or APU, respectively) is copied into local store 105 and also copied into the atomic cache 137.

Furthermore, a "reservation" is made for that reservation granule in the RS 135 during the getllar command. The size of the reservation granule is implementation dependent, but the implementation can be easier if the reservation granule matches the cache line size. The APU 110 program waits for getllar command completion by reading the command completion status from the DMA queue 120 via the control bus 103. The control bus 103 generally comprises a plurality of channels, wherein each channel carries predefined information. The getllar command is reported as "complete" once the reservation is set in RS 135 and the data copied to local store 105. The APU 110 program typically compares the data in local store 130 via local store bus 107 with an expected result, for example a value indicating that the lock was taken, or lock was free, and either reissues the getllar command via control bus 101 to DMA queue 120 if the value was not the expected result (such as a value designating lock taken). In a further embodiment, if the value is the expected result (such as lock free), the APU 110 program modifies the data in local store via local store bus 107 (to designate lock taken) and issues the putllc command via control bus 103 to DMA queue 120 to attempt to either "atomically" update the data in the atomic cache 137, or, alternatively, to ensure that the data it has in local store 105 is the latest copy from system memory 170 or another unit's cache of system memory.

If, prior to the "putllc" command execution, a "kill" type snoop of the atomic cache 137 for an address that falls within the reservation granule address stored in the reservation station 135 is received by the atomic facility 130 from the BIC 150, the reservation previously set by the execution of the getllar command is reset in reservation station 135. The kill type snoop command is typically received when other units attached to the BIC 150 attempt to modify (write) data that can be contained in atomic cache 137.

If the reservation is invalidated before the DMA engine 115 has the opportunity to copy the data from local store 105 to either the atomic cache 137 or the system memory 170 as a result of the putllc, the DMA engine 115 marks the putllc command with "reservation lost" status in the DMA queue 120, and does not copy the data from local store 105 to atomic cache 137 or to the system memory 170. If the reservation in reservation station 135 still exists for the reservation granule addressed by the putllc command, then the atomic facility 130 sends a kill type snoop command through the BIC 150 to other units, resetting any reservations the other units (APUs or MPUs) might have made in their atomic facilities for the same reservation granule. This is because the atomic facility 130 has finished processing this update of data before the other processors (MPUs, APUs) attached to BIC 150 had finished their processing, and this updated data becomes the data that should therefore be further employed by other processors.

Then, the DMA engine 115 copies the data from local store 105 to atomic cache 137 and the reservation is reset in reservation station 135. The DMA engine 115 then sets "Succeeded" status for the putllc command in the DMA queue 120. The APU 110 program uses the control bus 103 to wait for and read completion status of the putllc command from DMA queue 120 to determine if the status is "Succeeded" or "Reservation lost." If "Succeeded," the atomic operation is complete, if "Reservation lost," the entire sequence starting with the issuance of the getllar command must be retried by the APU 110 program.

Then, after successful completion of the putllc command and succeeding operations performed while holding the "lock," the APU 110 issues a putllu command to release the "lock." The putllu command is generally employed to unconditionally transfer the data from the APU 110 local store to the atomic cache 137. If the cache line is marked as present and exclusive in the atomic cache 137, the DMA engine 115 transfers data from the APU 110 local store to the atomic cache 137.

If the cache line is marked as present but not exclusive, the atomic facility issues a "declaim" snoop command which invalidates cache lines in other unit's caches having a copy of this data. The line is marked "exclusive" in this cache 137, and the DMA engine 115 transfers data from the APU 110 local store to the atomic cache 137. Finally, if the cache line is not present in the atomic cache 137, the atomic facility 130 determines whether the line is present in some other unit's cache by issuing a snoop request through BIC 150. If it is present in another unit's cache, the data is transferred from the other unit's cache to the atomic cache associated with the system 100 and the cache line containing the data is invalidated in the cache from which the data has been transferred. If the data is not present in another unit's cache, the memory controller 160 will supply the data from the shared memory 170. Either way, the cache line in the atomic cache containing the data is delineated as "exclusive." Then, the DMA engine 115 transfers data from the local store 105 to the atomic cache 137.

In other words, in the "compare and swap" atomic update, the APU 110 will issue in a loop the getllar command until the APU 110 gets a match for what it is comparing, which can be a value indicating a lock free. When the value compares favorably, the "swap" is attempted. That is, the value is changed, in some cases to a value indicating "lock taken." The putllc is then issued to "atomically swap the value," in some cases swap the old value of lock free with the new value of lock taken. Once this succeeds, the APU 110 "owns" the resource, in other words has either read or read/write privileges, and performs the further operations on the "locked" object. Then, when the APU 110 is finished, it "releases the lock," or in other words changes the value from "lock taken" to a value of "lock free." It does so by using the putllu command.

The presence of the atomic cache 137 plays a role in terms of atomic update performance. By their very nature, atomic updates of the same data can be frequently concurrently attempted by multiple APU complexes (APU/DMA Units) 192, MPU complexes 193 attached to BIC 150. Because atomic cache 137 can have the most up to date data associated with the lock line, when other caches are to be updated, it could be updated with the information from another atomic cache 137 and not necessarily from the system memory 170. In this embodiment, cache to cache transfers between multiple units can occur on the same integrated circuit chip, and can be substantially faster than system memory to cache transfers which generally occur between two separate integrated circuit chips.

Generally, the system 100 saves time by caching the results of DMA transfers of data used for synchronization in the atomic cache 137, but not caching all data transferred from the system memory 170, such as those memory transfers not of a synchronization nature. This saves significant chip real estate, in that the atomic cache 137 can be smaller than a cache that is employed to cache all DMA transfers of data between system memory and local store. Furthermore, the time required to retrieve specified data from the atomic cache 137 has been reduced, as the retrieval granule can be predefined to match a cache line size and alignment. Non-lockline DMA commands can have varying transfer sizes and alignments.

For instance, in one embodiment, four cache lines (128 bytes times 4) are reserved for data accessed using the lock line commands in the atomic cache 137, and this is the basic unit of cache to cache, cache to local store, system memory to cache, and so on, memory transfer. However, those of skill in the art understand that other reservation granule sizes can also be employed. Furthermore, the APUs themselves can provide the necessary synchronization and mutual exclusion directly through employment of the "lock line" commands.

Figure 2:
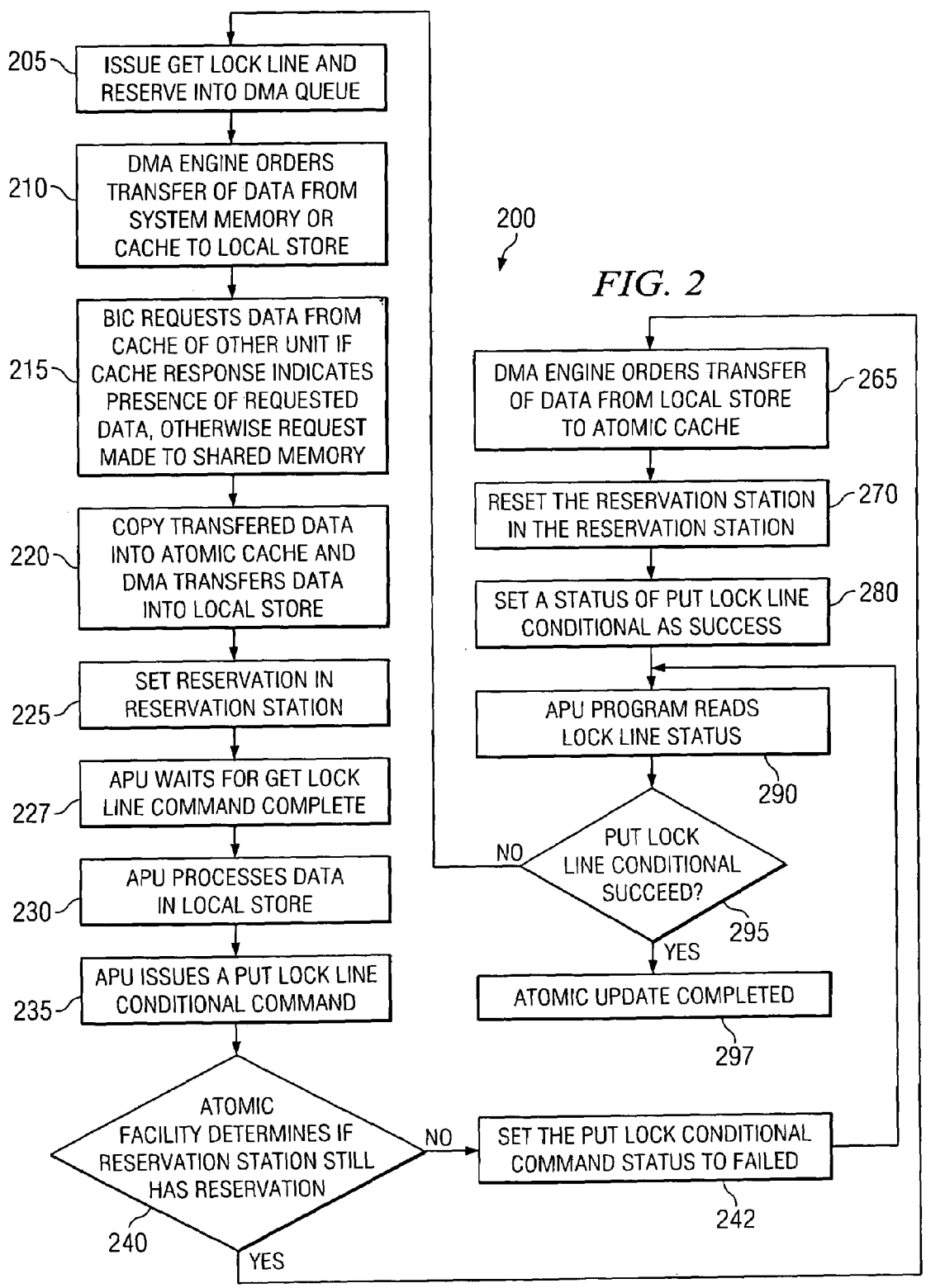
FIG. 2 illustrates a method of employing DMA get lockline with reservation and put lockline conditional into and out of a cache and local store.

Turning now to FIG. 2, illustrated is a method 200 for employing DMA atomic transfers in the system 100. Method 200 can employ specific commands and parameters to determine which of the atomic commands has been issued, and whether an error condition has resulted in an improper invocation or execution of a command.

In step 205, the getllar command is issued by the APU 110. In step 205, the APU 110 issues the atomic DMA command "getllar" onto its coupled control bus to be conveyed to the DMA queue 120. In this embodiment, the getllar command comprises three parameters. A first parameter is the local store address (LSA) to which the retrieved data is eventually to be sent in the local store 105. A second parameter is the effective address high (EAH) which is the high address of the data in system memory to be copied from. The third parameter is the effective address low (EAL) which is the low address of the data in system memory to be copied from. The EAH and EAL parameters define the location in shared memory involved in the atomic update sequence.

In step 205, the getllar command is placed to the front of the queue. This command is placed on the DMA queue 120. This command and associated parameters is written through a series of "write to channel" commands.

In step 210, the DMA engine orders a transfer of data from either the system memory 170 or an L2 cache 187 or atomic cache 137 to the local store 105. In step 215, if the data was not found in atomic cache 137, the BIC 150 then implements this data request. The BIC 150 first requests the selected data from any of the MPU complex(es) 193 L2 cache 187, and/or APU complex(es) 192 atomic cache 137, via a snoop request. If the requested data is not found in any of the caches, the BIC 150 then requests the data from the system memory 170. In step 220, as the data is transferred from either the L2 cache 187 or the system memory 170, as appropriate, a copy of the transferred data is stored in the atomic cache 137 and the DMA engine transfers the data from the atomic cache 137 to local store 105.

In step 225, a reservation is set up by the DMA engine 115 to the RS 135 with an address designating the reservation granule location involved in the getllar command. In step 227, the APU 110 waits for the completion notification that the getllar command is completed. In step 230, the APU 110 processes the data that was placed in its local store 105. In step 235, after processing and modifying the lock line data in local store, the APU 110 issues a putllc command.

In step 240, the atomic facility 130 determines if reservation station 130 still has a reservation for the lock line reservation granule previously set by the getllar command. If there is no reservation, then the putllc command status is set to "failed" in step 242, and is forwarded to step 290.

However, if the reservation still exists, then in step 265 the DMA engine 115 transfers the data from the local store 105 to the atomic cache 137. In step 270, the reservation station for this cache line is reset within the reservation station 135. In step 280, the status of the putllc command is stored as a "success" in the DMA queue 120. In step 290, the APU program reads the lock line status for the completion or non-completion of the putllc command. In step 295, if the putllc command is a failure, the entire sequence is re-executed beginning with step 205, and another getllar command issues. However, if the putllc command is a success, then the atomic update sequence of FIG. 2 ends in step 297.

Turning now to FIG. 3, disclosed is a method 300 for issuing a putllu command. Generally, the putllu command is used for releasing a software lock previously acquired by the atomic update sequence of FIG. 2.

In step 305, the APU 110 issues a putllu command into the DMA queue. In step 310, the DMZ4 engine 115 processes the putllu command, and requests a write of 128 bytes to the atomic cache 137. In step 315, the atomic cache 137 reads its directory to determine if the line is present in the atomic cache 137 and is in an exclusive state. In step 320, the atomic cache 137 determines whether the cache line is present in the associated atomic cache 137, and whether it is in an exclusive state.

If the cache line is present but not in an exclusive state in the associated atomic cache 137, in step 330, the atomic cache 137 requests the BIC 150 to obtain the data with exclusive access. Although "Modified, Exclusive, Shared, and Invalid" (MESI) cache control protocol can be employed, other forms of cache control protocols are within the scope of the present invention.

Once the cache line is present and exclusive in the associated atomic cache 137, in step 338, the atomic facility 130 orders the DMA engine 115 to begin to transfer from the local store 105 to the atomic cache 137 data. Generally, having the transfer of atomic data transfers in the atomic cache 137 allows for much faster processing to the local store 105 over a data bus from the atomic cache 137 than would otherwise be present between a transfer from the local store 105 to the system/shared memory 170.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An asymmetric single-chip heterogeneous multiprocessor computer system, comprising:
   an attached processor unit configured to generate one of a get lock line command with reservation, a put lock line conditional command, and a put lock line unconditional command; and
   a direct memory access engine coupled to the attached processor unit, the direct memory access engine employable to receive one of a get lock line command with reservation, a put lock line conditional command, and a put lock line unconditional command.

2. The system of claim 1, further comprising a local store coupled to the attached processor unit.

3. The system of claim 2, further comprising a cache snoop bus coupled to the direct memory access engine.

4. An apparatus for atomic update for direct memory access of shared memory in a single-chip heterogeneous multiprocessor computer system, the apparatus comprising:
   a plurality of processor units of a first type;
   a processor unit of a second type;
   a shared memory, wherein the shared memory is shared among the plurality of processor units of the first type and the processor unit of the second type;
   a direct memory access engine associated with a given processor unit within the plurality of processor units of the first type;
   a local store associated with the given processor unit; and
   a reservation station associated with the given processor unit,
   wherein the given processor unit issues a load and reserve direct memory access command to transfer an amount of data from the shared memory to the local store associated with the given processor unit;
   wherein the direct memory access engine receives the load and reserve direct memory access command and loads the amount of data to the local store associated with the given processor unit, wherein a location of the amount of data is specified by the load and reserve direct memory access command; and
   wherein the reservation station associated with the given processor unit makes a reservation of the amount of data.

5. The apparatus of claim 4, further comprising:
   an atomic cache associated with the given processor unit, wherein the amount of data is a cache line and wherein if the amount of data is stored in the atomic cache associated with the given processor unit, the direct memory access engine loads the amount of data from the atomic cache to the local store.

6. The apparatus of claim 5, wherein if the amount of data is stored in an atomic cache associated with a second processor unit within the plurality of processor units of the first type, the direct memory access engine loads the amount of data from the atomic cache associated with the second processor unit to the local store associated with the given processor unit.

7. The apparatus of claim 5, wherein if the amount of data is not stored in the atomic cache associated with the given processor unit, the direct memory access engine loads the amount of data from the shared memory to the local store.

8. The apparatus of claim 7, wherein the given processor unit performs operations on the amount of data in the local store to form processed data and issues a conditional store direct memory access command, wherein responsive to receiving the conditional store direct memory access command, the direct memory access engine determines whether the reservation still exists and, if the reservation still exists, copies the processed data from the local store to the atomic cache associated with the given processor unit.

9. The apparatus of claim 8, wherein the reservation station releases the reservation of the amount of data.

10. The apparatus of claim 8, wherein the reservation station resets the reservation responsive to a kill type snoop for an address that falls within the amount of data.

11. The apparatus of claim 8, wherein if the reservation does not still exist, the direct memory access engine retries the load and reserve direct memory access command.

12. The apparatus of claim 5, wherein the given processor unit performs operations on the amount of data in the local store to form processed data and issues an unconditional store direct memory access command, wherein responsive to receiving the unconditional store direct memory access command, the direct memory access engine copies the processed data from the local store to the atomic cache associated with the given processor unit.

13. The apparatus of claim 12, wherein the reservation station releases the reservation of the amount of data.

14. The apparatus of claim 12, wherein prior to copying the modified data from the local store to the atomic cache, the reservation station determines that the cache line is not exclusive and invalidates the cache line for one or more other processor units within the plurality of processor units of the first type.

* * * * *